US012392258B2

(12) United States Patent
Vogel et al.

(10) Patent No.: US 12,392,258 B2
(45) Date of Patent: Aug. 19, 2025

(54) EXTERIOR FERRULE OF AN INTERMEDIATE HOUSING MADE OF COMPOSITE MATERIAL FOR AN AIRCRAFT TURBINE ENGINE

(71) Applicant: SAFRAN AIRCRAFT ENGINES, Paris (FR)

(72) Inventors: Thibaut Vogel, Moissy-Cramayel (FR); Laurent Jean Baptiste Baroumes, Moissy-Cramayel (FR); Francois Charleux, Moissy-Cramayel (FR); Hervé Grelin, Moissy-Cramayel (FR); Azath Mohamed, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 83 days.

(21) Appl. No.: 18/554,307

(22) PCT Filed: Apr. 5, 2022

(86) PCT No.: PCT/FR2022/050637
§ 371 (c)(1),
(2) Date: Oct. 6, 2023

(87) PCT Pub. No.: WO2022/214765
PCT Pub. Date: Oct. 13, 2022

(65) Prior Publication Data
US 2024/0191637 A1    Jun. 13, 2024

(30) Foreign Application Priority Data
Apr. 8, 2021 (FR) ...................... 2103576

(51) Int. Cl.
*F01D 25/24* (2006.01)
*B29C 70/24* (2006.01)
(Continued)

(52) U.S. Cl.
CPC .............. *F01D 25/24* (2013.01); *B29C 70/24* (2013.01); *B29C 70/48* (2013.01);
(Continued)

(58) Field of Classification Search
CPC .... F01D 25/24; F01D 25/28; F05D 2300/603; F05D 2300/6034; F05D 2400/14;
(Continued)

(56) References Cited

U.S. PATENT DOCUMENTS 5,437,538 A * 8/1995 Mitchell ............... F01D 21/045
428/105
8,172,527 B2   5/2012 Duchatelle et al.
(Continued)

FOREIGN PATENT DOCUMENTS

FR        2925120 A1    6/2009
WO    2018/234669 A1   12/2018

OTHER PUBLICATIONS

International Search Report for PCT/FR2022/050637 dated Aug. 11, 2022.
Written Opinion for PCT/FR2022/050637 dated Aug. 11, 2022.

*Primary Examiner* — Nathaniel E Wiehe
*Assistant Examiner* — Aye S Htay
(74) *Attorney, Agent, or Firm* — McDonald Hopkins LLC

(57) ABSTRACT

An exterior ferrule of an intermediate housing for an aircraft turbine engine, the ferrule made of composite material comprising a downstream annular linking end forming a peripheral groove and intended to receive a complementary linking member provided on one or more nacelle cowls, the ferrule being made from: a first fibrous preform obtained by three-dimensional weaving of yarns and densified by a matrix, the preform defining a drum of the ferrule as well as a structural part of the downstream groove wall; and a second fibrous preform obtained by three-dimensional
(Continued)

weaving of yarns and densified by a matrix, the preform defining a base abutting the exterior of the drum defined by the first preform, as well as a structural part of the upstream groove wall.

11 Claims, 5 Drawing Sheets

(51) Int. Cl.
  *B29C 70/48* (2006.01)
  *B29K 63/00* (2006.01)
  *B29K 105/08* (2006.01)
  *B29K 307/04* (2006.01)
  *B29L 31/00* (2006.01)

(52) U.S. Cl.
  CPC .. *B29K 2063/00* (2013.01); *B29K 2105/0845* (2013.01); *B29K 2307/04* (2013.01); *B29L 2031/7504* (2013.01); *F05D 2300/6034* (2013.01)

(58) Field of Classification Search
  CPC ......... B29C 70/24; B29C 70/48; B29B 11/16; B29D 29/06; B29K 2105/0845
  See application file for complete search history.

(56) References Cited

U.S. PATENT DOCUMENTS

| | | |
|---|---|---|
| 2007/0217913 A1 | 9/2007 | Fournier et al. |
| 2009/0200700 A1* | 8/2009 | Marlin ................. B29C 70/545 |
| | | 285/136.1 |
| 2012/0099981 A1* | 4/2012 | Verseux ............... F01D 21/045 |
| | | 415/200 |
| 2013/0207303 A1 | 8/2013 | Marlin et al. |
| 2013/0227963 A1 | 9/2013 | Hurlin et al. |
| 2016/0047275 A1 | 2/2016 | Quinn et al. |

* cited by examiner

EXTERIOR FERRULE OF AN INTERMEDIATE HOUSING MADE OF COMPOSITE MATERIAL FOR AN AIRCRAFT TURBINE ENGINE

This is the National Stage of PCT international application PCT/FR2022/050637, filed on Apr. 5, 2022 entitled "EXTERIOR FERRULE OF AN INTERMEDIATE HOUSING MADE OF COMPOSITE MATERIAL FOR AN AIRCRAFT TURBINE ENGINE", which claims the priority of French Patent Application No. 2103576 filed Apr. 8, 2021, both of which are incorporated herein by reference in their entireties.

TECHNICAL FIELD

The invention relates to the field of intermediate housings for aircraft turbine engines, and more precisely to the manufacture of the exterior ferrule of such an intermediate housing.

A ferrule of an intermediate housing of an aircraft turbine engine n is for example known from the document FR 2 925 120 A1.

PRIOR ART

As is known, a mast for mounting a turbine engine, also referred to as an "EMS" ("engine mounting structure"), or "pylon" or "engine pylon", conventionally makes it possible to suspend the turbine engine and at the wing of the aircraft. Provision is in fact made for forming the connecting interface between the turbine engine and a given structural part of the aircraft, often the front wing chamber. It makes it possible to transmit, to the structure of this aircraft, the forces generated by the turbine engine, and also allows routing of the fuel and of the electrical, hydraulic and air systems between the turbine engine and the aircraft.

As for the nacelle, this is conventionally equipped with several cowls enclosing the turbine engine, and allowing access to the latter in the open position. These cowls are known by the terms fan cowls and thrust reverser cowls, these being hinged on the primary structure of the attaching pylon.

The turbojet engine includes a fan housing extended rearwards by a so-called intermediate housing, comprising an exterior ferrule, an internal hub, and structural arms angularly distributed and extending radially between the hub and the exterior ferrule that they connect.

The intermediate housing therefore corresponds to the structural element arranged between the fan housing located further upstream and nacelle cowls located further downstream. More precisely, the annular downstream end of the intermediate housing is dedicated to implementing the interface between this intermediate housing and nacelle cowls, generally the thrust reverser cowls.

The annular downstream end of the intermediate housing forms an annular, or substantially annular, peripheral groove, open radially towards the outside. This groove is intended to receive a complementary connecting member provided on the thrust reverser cowls, and is moreover delimited by an upstream groove wall, as well as by a downstream groove wall, both being radial walls. The complementary connecting member can thus be a radial rib extending inwards, so as to be housed in the groove between the two upstream and downstream walls.

The cooperation between the rib and the groove allows transmission of the aerodynamic forces from the nacelle to the turbine engine, in take-off, flight and landing phases, in particular the axial forces, and even more particularly the counter-thrust axial forces when the thrust reverser systems equipping the nacelle cowls are actioned.

This arrangement, which is characterised by the simple penetration of the rib in the groove, allows easy and rapid opening of the reverser cowls hinged on the pylon, this opening being for example achieved for implementing maintenance operations on the aircraft parked on the ground.

For manufacturing the exterior ferrule of the intermediate housing, several solutions are known, including those aimed at producing the barrel of this ferrule from composite material, and adding thereto a metal downstream end structure defining the groove.

The barrel of the exterior ferrule is therefore manufactured from composite material, normally from a fibrous reinforcement densified by a matrix, preferably resin, such as epoxy resin. In this case, the barrel is manufactured from a fibrous preform that can be obtained in various ways known to a person skilled in the art, typically by three-dimensional weaving of threads (3D weaving), or by draping two-dimensional fibrous fabrics.

The use of a composite material for the exterior ferrule barrel reduces the mass of the turbine engine, but this mass is still impacted by the presence of the metal downstream end structure defining the peripheral groove, as well as by the mechanical securing means required at the interface, such as bolts.

The aim of the invention is therefore to further reduce the mass of the exterior ferrule of the intermediate casing, while proposing a design facilitating manufacture thereof.

DESCRIPTION OF THE INVENTION

To meet the aim identified above, the object of the invention is first of all an exterior ferrule of an intermediate casing for an aircraft turbine engine, the ferrule made from composite material comprising an annular connecting downstream end forming a peripheral groove radially open towards the outside, said groove being intended to receive a complementary connecting member provided on one or more nacelle cowls, and this groove being delimited by an upstream groove wall, as well as by a downstream groove wall.

According to the invention, the ferrule is produced from:
  a first fibrous preform obtained by three-dimensional weaving of threads and densified by a matrix, the first preform defining a barrel of the ferrule and a structural part of the downstream groove wall, projecting radially outwards with respect to the barrel; and
  a second fibrous preform or a group of second fibrous preforms, each second fibrous preform being obtained by three-dimensional weaving of threads and densified by a matrix, the second preform or the group of second preforms defining a base externally attached to the barrel defined by the first preform, as well as a structural part of the upstream groove wall, projecting radially outwards with respect to the barrel.

The invention has the advantage of reduced mass, because of its "all composite" design and the absence of mechanical securing means, such as bolts. This reduction in mass of the exterior ferrule affords a reduction in the specific consumption of the turbine engine, and thus fits within a procedure for reducing greenhouse gas emissions.

In addition, the invention advantageously makes provision for producing the peripheral groove by means of two preforms, to simplify their shape, and consequently to facilitate their production. The downstream groove wall being the most mechanically stressed during the counter-thrust phases, it proves to be particularly judicious to incorporate the structural part of this downstream wall within a single preform also defining the barrel of the ferrule, corresponding to the most important structural part of this exterior intermediate-housing ferrule. The upstream groove wall for its part remaining less mechanically stressed by the nacelle cowls, the formation thereof from a dedicated preform, attached to the other preform, constitutes a perfectly suitable technical solution.

Preferably, the invention provides at least any one of the following optional features, considered separately or in combination.

Preferably, in the case of a second fibrous preform, i.e. with a single second 3D-woven fibrous preform, this has an annular or substantially annular shape centred on a longitudinal central axis of the ferrule, and in the other case of a group of second fibrous preforms, each of them is in the form of an angular sector to form together an annular or substantially annular structure centred on the longitudinal central axis of the ferrule.

Preferably, the ferrule comprises a non-friction cladding covering the upstream and downstream groove walls, inside the groove, the non-friction cladding preferentially being a fabric or a foil. The non-friction cladding reduces friction between the exterior ferrule and the nacelle cowls, at the groove forming the interface between these elements. This limits wear on these elements, and increases the service life thereof.

Preferably, the ferrule also comprises a third fibrous preform or a group of third fibrous preforms, each third fibrous preform being obtained by three-dimensional weaving of threads and densified by a matrix, the third preform or the group of third preforms defining a base internally attached to the barrel defined by the first preform, as well as a structural gasket span projecting axially downstream beyond the downstream groove wall, the third preform or each preform of the group of third preforms preferably being loosened on weaving so as also to define an additional base externally attached to the downstream groove wall. Though this additional base remains optional, it should be noted that it reinforces the mechanical strength of the structural gasket span.

Another object of the invention is an aircraft turbine engine comprising such an exterior intermediate-housing ferrule. The turbine engine is preferably a turbojet engine, preferably of the bypass and/or twin spool type, but other types of turbine engine can also be envisaged, such as a turboprop engine, without departing from the scope of the invention. Highly preferentially, the invention relates to a turbojet engine with a very high dilution ratio, also referred to as UHBR (ultrahigh bypass ratio) turbojet engine.

Another object of the invention is a method for manufacturing an exterior ferrule of an intermediate casing for an aircraft turbine engine, the ferrule made from composite material comprising an annular connecting downstream end forming a peripheral groove radially open towards the outside, said groove being intended to receive a complementary connecting member provided on one or more nacelle cowls, and this groove being delimited by an upstream groove wall, as well as by a downstream groove wall.

According to the invention, the method includes the following steps:
producing a first fibrous preform obtained by three-dimensional weaving of threads and densified by a matrix, the first preform defining a barrel of the ferrule and a structural part of the downstream groove wall, projecting radially outwards with respect to the barrel; and
producing a second fibrous preform or a group of second fibrous preforms, each second fibrous preform being obtained by three-dimensional weaving of threads and densified by a matrix, the second preform or the group of second preforms the intended to define a base, as well as a structural part of the upstream groove wall, projecting radially outwards with respect to the barrel;
injecting and polymerising a matrix for densifying the first preform; and
injecting and polymerising a matrix for densifying the second preform or the group of second preforms, so that the base is fixedly and externally attached to the barrel of the ferrule.

The advantages relating to this manufacturing method are those mentioned above, with respect to the exterior ferrule that is also an object of the invention. As will be detailed below, the various steps of injecting matrices can be implemented simultaneously, by co-injection, or successively.

This is because it is for example arranged so that the injection of a matrix for densifying the first preform takes place at the same time as the injection of a matrix for densifying the second preform or group of second preforms, by matrix co-injection preferably in a flexible-injection tool, in a rigid-mould matrix transfer tool, or in a hybrid flexible-injection and rigid-mould matrix transfer tool. The injection technique sought by means of a rigid-mould matrix transfer tool is preferentially resin transfer moulding or RTM. The injection technique sought with the flexible-injection tool is preferentially impregnation in an impregnation chamber partly defined by a flexible impermeable membrane. This technique is optionally implemented by means of a compaction chamber separated from the impregnation chamber by the membrane, as is for example known from the document WO 2018/234669 A1.

One or other of these two preferential injection techniques can in fact be adopted for producing the exterior ferrule, or they can preferentially be combined.

According to another example of producing the exterior ferrule, first of all the injection and polymerisation of a matrix for densifying the first preform is proceeded with, preferably in a rigid-mould matrix transfer tool, then next, during a subsequent curing step, the injection and polymerisation of a matrix for densifying the second preform or of the group of second preforms is proceeded with, preferably in a rigid-mould matrix transfer tool. In this example, the consolidation of the second preform or of the group of second preforms thus takes place after the consolidation of the first preform. Still in this example, other types of tool and other injection methods can be adopted, without departing from the scope of the invention.

Preferably, the method comprises the production of a non-friction cladding covering the upstream and downstream groove walls, inside the groove, the non-friction cladding preferably being produced by co-curing during the curing of the first preform and of the second preform or of the group of second preforms, or bonded to the upstream and downstream groove walls after said curing.

Preferably, the method also comprises:
the production of a third fibrous preform or a group of third fibrous preforms, each third fibrous preform being obtained by three-dimensional weaving of threads, the third preform or the group of third preforms being intended to define a base as well as a structural gasket span projecting axially downstream beyond the downstream groove wall; and injection and polymerisation of a matrix for densifying the third preform or of the group of third preforms, so that the base is fixedly and internally attached to the barrel of the ferrule.

Here also, the curing of the third preform or of the group of third preforms can be done by co-curing during the curing of the first preform, or during a subsequent curing step.

Finally, the method can also comprise the production of a non-friction cladding covering the structural gasket span. In this case, the non-friction cladding is preferably produced by co-curing during the curing of the third preform or of the group of third preforms, or bonded after said curing. Other advantages and features of the invention will appear in the non-limiting detailed description hereinbelow.

BRIEF DESCRIPTION OF THE DRAWINGS

This description will be given with reference to the appended drawings, wherein.

DETAILED DESCRIPTION OF PARTICULAR EMBODIMENTS

Figure 1:
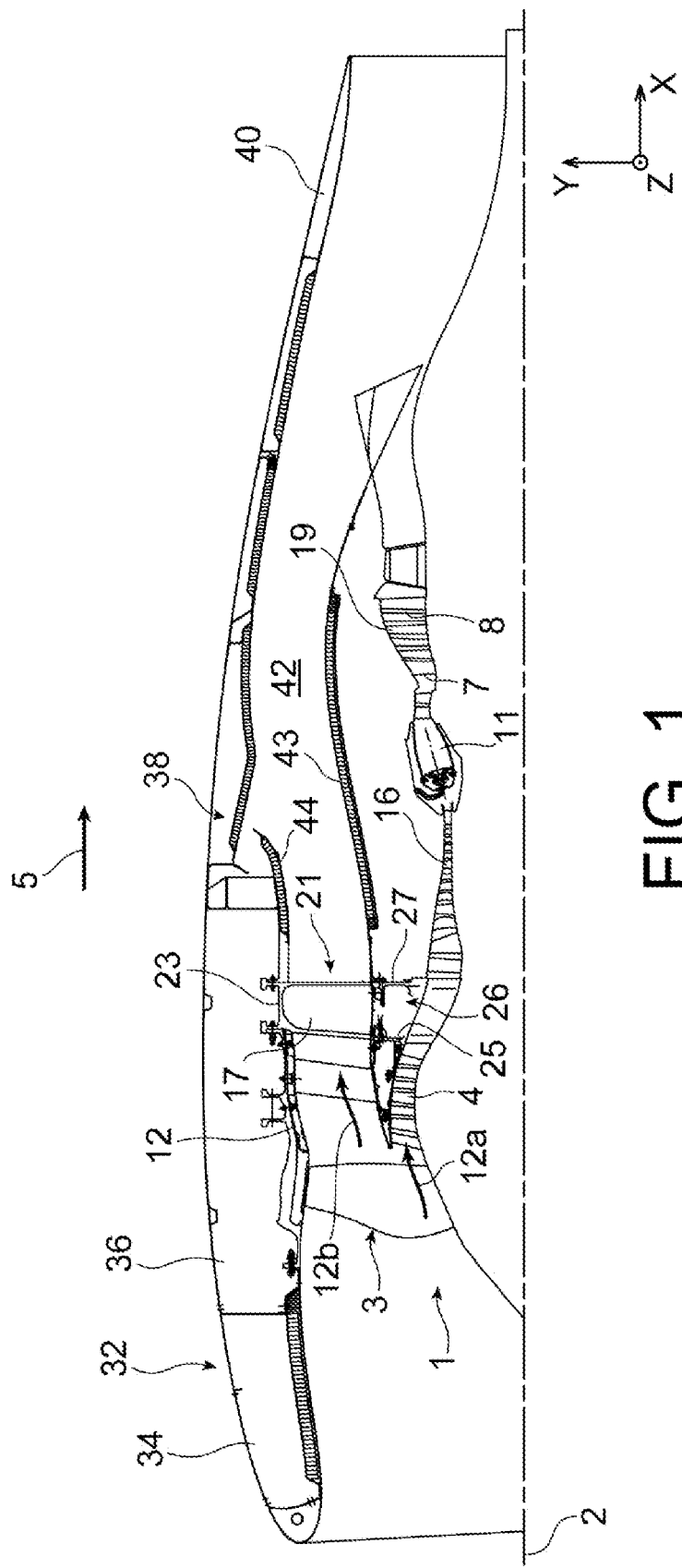
FIG. 1 shows a view in axial half-section of an aircraft turbine engine, according to a preferred embodiment of the invention.

With reference first of all to FIG. 1, an aircraft turbine engine 1 is shown, according to a preferred embodiment of the invention. It is a case here of a bypass twin-spool turbojet engine. Nevertheless, it could be a case of a turbine engine of another type, for example a turboprop engine, without departing from the scope of the invention.

The turbojet engine 1 has a central longitudinal axis 2 around which its various components extend. It comprises, from upstream to downstream according to a main direction 5 of gas flow through this turbine engine, a fan 3, a low-pressure compressor 4, a high-pressure compressor 6, a combustion chamber 11, a high-pressure turbine 7 and a low-pressure turbine 8.

Conventionally, after having passed through the fan, the air divides into a central primary flow 12a and a secondary flow 12b that surrounds the primary flow. The primary flow 12a flows in a main duct for circulation of the gases passing through the compressors 4, 6, the combustion chamber 11 and the turbines 7, 8. The secondary flow 12b for its part flows in a secondary duct delimited radially outwards by an engine housing, surrounded by a nacelle 32.

The engine housing is divided into a plurality of elements, including an intermediate housing 21, comprising an exterior ferrule 23 located aerodynamically in line downstream from a fan housing 12.

The intermediate housing 21 also includes a hub 26 formed by transverse plates 25, 27 disposed radially internally with respect to the exterior ferrule 23, the housing 21 furthermore comprising structural arms 17 angularly distributed and extending radially to connect the exterior ferrule 23 and the hub 26.

The turbojet engine also comprises a central housing 16, also referred to as a "core" housing, extending the hub 26 of the intermediate housing 21 downstream, and to which it is connected. It should be noted that the central housing extends as far as a rear end 19 with the largest dimension, also referred to as ejection housing.

As is known and as will be detailed subsequently, the exterior ferrule 23 of the intermediate housing includes a downstream end for connection with a peripheral groove, the main purpose of which is to establish a connection between this exterior ferrule 23 and the nacelle cowls directly adjacent downstream.

The nacelle 32 forms a continuous aerodynamic external surface by means of various adjacent elements that follow each other from upstream to downstream, including an air inlet 34, fan cowls 36, thrust-reverser cowls 38, and a fixed rear cowling 40.

The thrust-reverser cowls 38, generally two in number and hinged on the rigid structure of a pylon attaching the turbojet engine 1, delimit in a known manner an annular secondary-flow channel 42, by means of external 44 and internal 43 annular skins.

Figure 2:
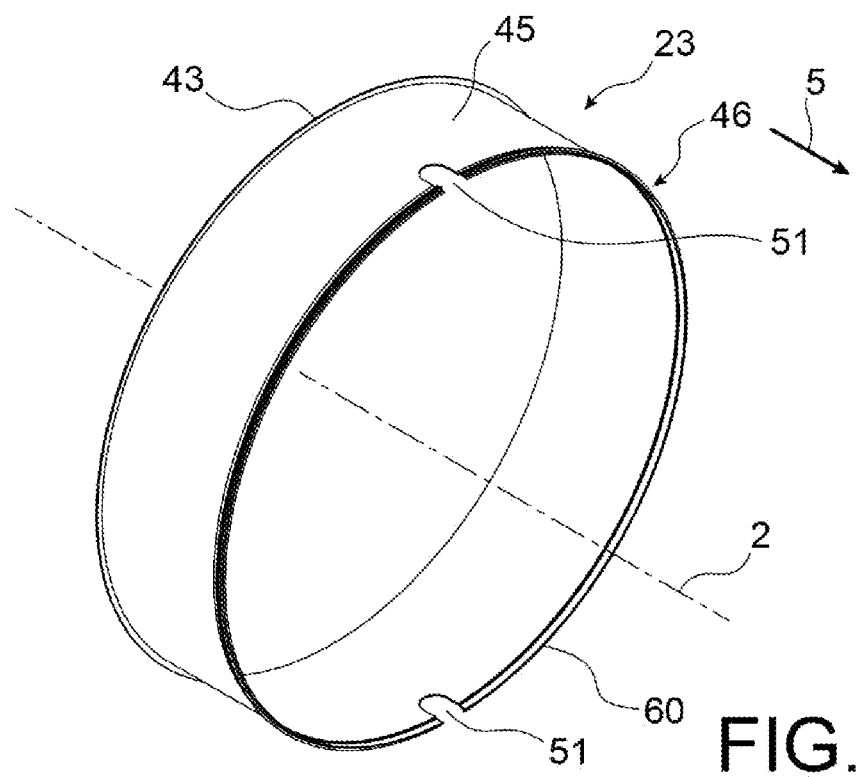
FIG. 2 shows a perspective view of the exterior ferrule of the intermediate housing equipping the turbine engine shown in the previous figure.
Figure 3:
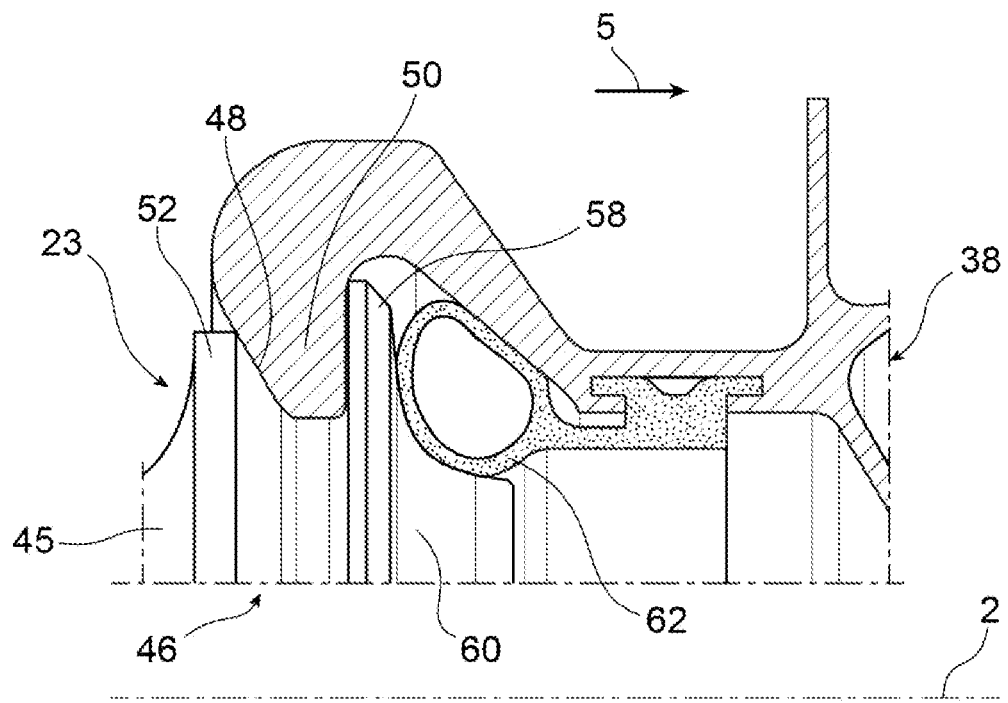
FIG. 3 shows an enlarged partial view in axial section showing the cooperation between the exterior intermediate-housing ferrule and a nacelle cowl.

Each thrust-reverser cowl 38, also referred to as rear cowl or "core" cowl, is in the general form of a half-cylinder, with its top end intended to be hinged on the rigid structure of the pylon, and its bottom end intended to be locked at the bottom end of the other cowl 38, by conventional means. With its upstream end, and in its closed position, each thrust-reverser cowl 38 is therefore connected to the annular downstream end for connecting the exterior ferrule 23 of the intermediate housing. FIG. 2 shows the exterior ferrule 23 to a larger scale, while FIG. 3 shows the cooperation between this ferrule 23 and the thrust-reverser cowls 38 (only one of them being visible on this FIG. 3).

The exterior ferrule 23, also an object of the present invention, extends around a longitudinal central ferrule axis, corresponding to the axis 2 of the turbojet engine. The structural part of the exterior ferrule 23 is produced entirely from composite material, forming a single piece successively incorporating, from upstream to downstream, an upstream radial flange 42 for attaching to the fan housing, a ferrule barrel 45 substantially cylindrical in shape and with a circular cross-section, and finally the annular downstream connection end 46. This forms a peripheral groove 48 open radially towards the outside, annular or substantially annular in shape. This groove 48 can be interrupted by notches 51, for example two axial notches 51 passing through the annular downstream connecting end 46 in diametrically opposite clock positions, at 12 o'clock and 6 o'clock as is known to persons skilled in the art.

The groove 48 adopts for example a rough V shape, and receives a rib 50 provided on the upstream end of each thrust-reverser cowl 38. As is visible on FIG. 3, the rib 50 preferably extends radially inwards, with a rough V shape complementary to that of the groove 48. Each rib 50 preferentially extends over an angular sector of approximately 180°, or over a slightly smaller angle value. It thus constitutes a complementary connection member cooperating with the groove 48, to produce the interface between the ferrule 23 and each cowl 38.

The annular groove 48 is axially delimited firstly by means of an upstream groove wall 52 and secondly by means of a downstream groove wall 58. Each of these walls 52, 58 extends radially outwards with respect to the barrel 45, and has an annular shape centred on the axis 2, or substantially annular shape if axial notches 51 are produced.

The cooperation between the peripheral groove 48 and each complementary rib 50 allows transmission of the aerodynamic forces from the thrust-reverser cowls 38 to the turbojet engine, in particular the axial forces, and even more particularly the axial counter-thrust forces.

Downstream of the downstream groove wall 58, the connecting end 46 includes a structural gasket span 60. This span 60 is located projecting axially downstream with respect to the downstream groove wall 58, and receives a gasket 62 carried by the upstream end of the thrust-reverser cowl 38. This gasket 62 can thus be crushed on the structural span 60 when the cowl 38 is closed, but also crushed on the downstream surface of the downstream groove wall 58, as shown by FIG. 3.

Figure 4:
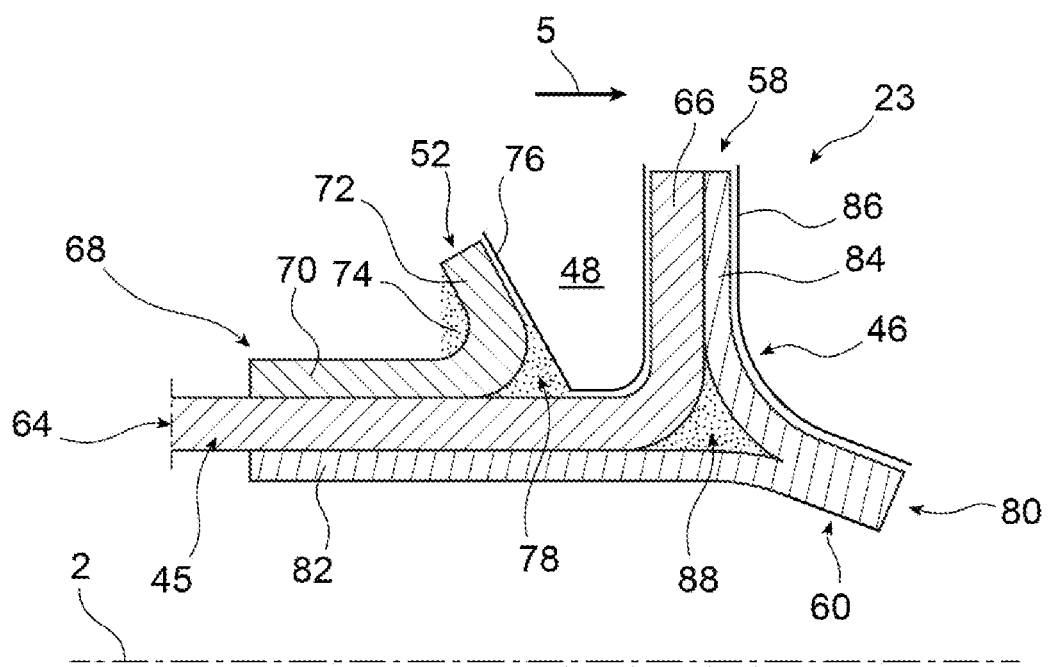
FIG. 4 shows a partial view in axial half-section of the exterior ferrule, before the steps of matrix injection and polymerisation thereof.

With reference now to FIG. 4, the various elements from which the exterior ferrule 23 is produced are shown. It should be noted that the design thereof, termed "fully composite", gives rise to the absence of mechanical attachment means between the various parts thereof, and therefore the absence of bolts, rivets, etc.

On FIG. 4, the elements constituting the ferrule 23 are shown in a state corresponding to that before impregnation thereof by a matrix of the resin type, preferably an epoxy resin, and therefore before the during step/steps leading to the polymerisation/consolidation of the resin. FIG. 4 therefore shows, in particular, fibrous preforms all produced by 3D weaving of threads, intended to be densified by the resin injected subsequently. Typically, the fibres used for producing the preforms are carbon fibres, even if other conventional materials can be envisaged without departing from the scope of the invention.

First of all a first fibrous preform 64 is provided, intended to define the upstream flange for attaching the ferrule (not visible on FIG. 4), the barrel 45, and a structural part 66 of the downstream groove wall 58. The part 66 extends radially outwards with respect to the barrel, adopting an annular or substantially annular shape. This structural part 66 of the downstream groove wall 58, defined by the first preform 64, extends over the entire radial length of the finalised downstream groove wall 58, or over substantially the entire length thereof. The first preform 64 is thus preferentially annular, centred on the axis 2, and with a half-section roughly in a U shape.

Next, a second fibrous preform 68 is provided, or a group of second fibrous preforms. The choice between these two solutions is dictated according to the manner in which the production of the upstream groove wall 52 is required, either in a single piece continuous in the circumferential direction, or sectorised in this same direction. In the first case of a single second fibrous preform 68, this then has an annular or substantially annular shape centred on the axis 2, and in the second case of a group of second fibrous preforms, each of them is in the form of an angular sector to form together an annular or substantially annular structure centred on this same axis 2. It is a case for example of two angular sectors, each of approximately 180°.

Hereinafter, only the first case will be considered, it nevertheless being stated that the principle remains identical or similar when a sectorised production of the upstream groove wall 52 is proceeded with, which may be motivated by the presence of the aforementioned axial notches on the ferrule 23.

Thus the second fibrous preform 68 is woven so as to define a base 70 intended to be fixedly and externally attached to the barrel 45, on a downstream end of the latter, and also so as to define a structural part 72 of the upstream groove wall 52, projecting radially outwards with respect to the barrel 45.

Instead of being strictly radial as the structural part 66 of the downstream groove wall 58 can be, the structural part 72 of the upstream groove wall 52 can be inclined upstream, so as to procure the required rough V shape for the groove 48. In this case, the hollow defined by the connecting radius between this structural part 72 and the external surface of the base 70 can be filled in by means of a filling material 74, preferably polymerisable.

The structural part 72 extends radially outwards with respect to the barrel 45 and with respect to the base 70, adopting an annular or substantially annular shape. This structural part 72 defined by the second preform 68 extends over the entire radial length of the finalised upstream groove wall 52, or over substantially the entire length thereof. The second preform 68 is thus preferentially annular, centred on the axis 2, and with a half-section in a roughly V shape open axially upstream and radially outwards.

To reduce friction between the two groove walls 52, 58 and the rib of the nacelle cowls intended to be housed in the groove 48, the ferrule 23 comprises a non-friction cladding 76 that matches all or part of the internal surface of this groove. In particular, the cladding 76 covers the two upstream and downstream walls 52, 58, and more precisely the two structural parts 72, 66 defined by the preforms 64, 68. By way of indication, it should be noted that the non-friction cladding 76 in a V shape, complementary to that of the groove 48, can have attachment ribs (not shown) for facilitating the attachment to the preforms 64, 68, and/or can be extended radially outwards to cover the ends of the structural parts 66, 72, in order to protect them against shocks. Such implementations are for example known from the document FR 2 994 216 A1.

The non-friction cladding 76 may be a woven fabric intended to be impregnated and cured at the same time as the first and second fibrous preforms 64, 68. Alternatively, it may be a case of a foil, for example metallic, bonded to the walls of the groove 52, 58 during a subsequent phase, after curing thereof.

When the aforementioned elements are positioned, a hollow may be formed between the following elements:
- the external surface of the first preform 64, at the bottom of the groove 48;
- the non-friction cladding 76; and
- the connecting radius between the base 70 and the structural part 72 defined by the second preform 68.

This hollow can also be filled in by means of a filling material 78, preferably polymerisable.

Next, a third fibrous preform 80 is provided, or a group of third fibrous preforms. Here also, only the first case of a single third fibrous preform will be described, it nevertheless being stated that the principle remains identical or similar when a sectorised production of the structural gasket span 60 is proceeded with.

Thus the third fibrous preform 80 is woven so as to define a base 82 intended to be fixedly and internally attached to the barrel 45, on a downstream end of the latter, and also so as to define the structural gasket span 60, projecting radially downstream beyond the downstream groove wall 58. A loosened weaving of the third preform 80 is preferentially implemented, so as also to define an additional base 84 intended to be attached externally to a downstream surface of the structural part 66 defined by the first preform 64. The additional base 84 not only reinforces the mechanical strength of the structural gasket span 80 on the ferrule, but also reinforces the structural part 66 of the downstream groove wall 58, while running along the latter, preferably over the entire radial length thereof or over substantially all this length.

The third preform 80 is thus preferentially annular, centred on the axis 2, and with a half-section in a roughly Y shape open axially upstream and radially outwards.

To reduce the friction with the gasket, another non-friction cladding 86 can follow the downstream external surface of the additional base 84, and/or of the structural span 60.

The non-friction cladding 86 may here also be a woven fabric intended to be impregnated and cured at the same time as the first, second and third fibrous preforms 64, 68, 80. Alternatively, it may be a case of a foil subsequently attached by bonding, after consolidation of the rest of the ferrule.

When the third preform 80 is positioned, a hollow may be formed between the following elements:
the base 82 defined by the third preform 80;
the additional base 84 defined by the third preform 80;
the connecting radius between the barrel 45 and the structural part 66 defined by the first preform 64.

This hollow can also be filled in by means of a filling material 88, preferably polymerisable.

Figure 5:
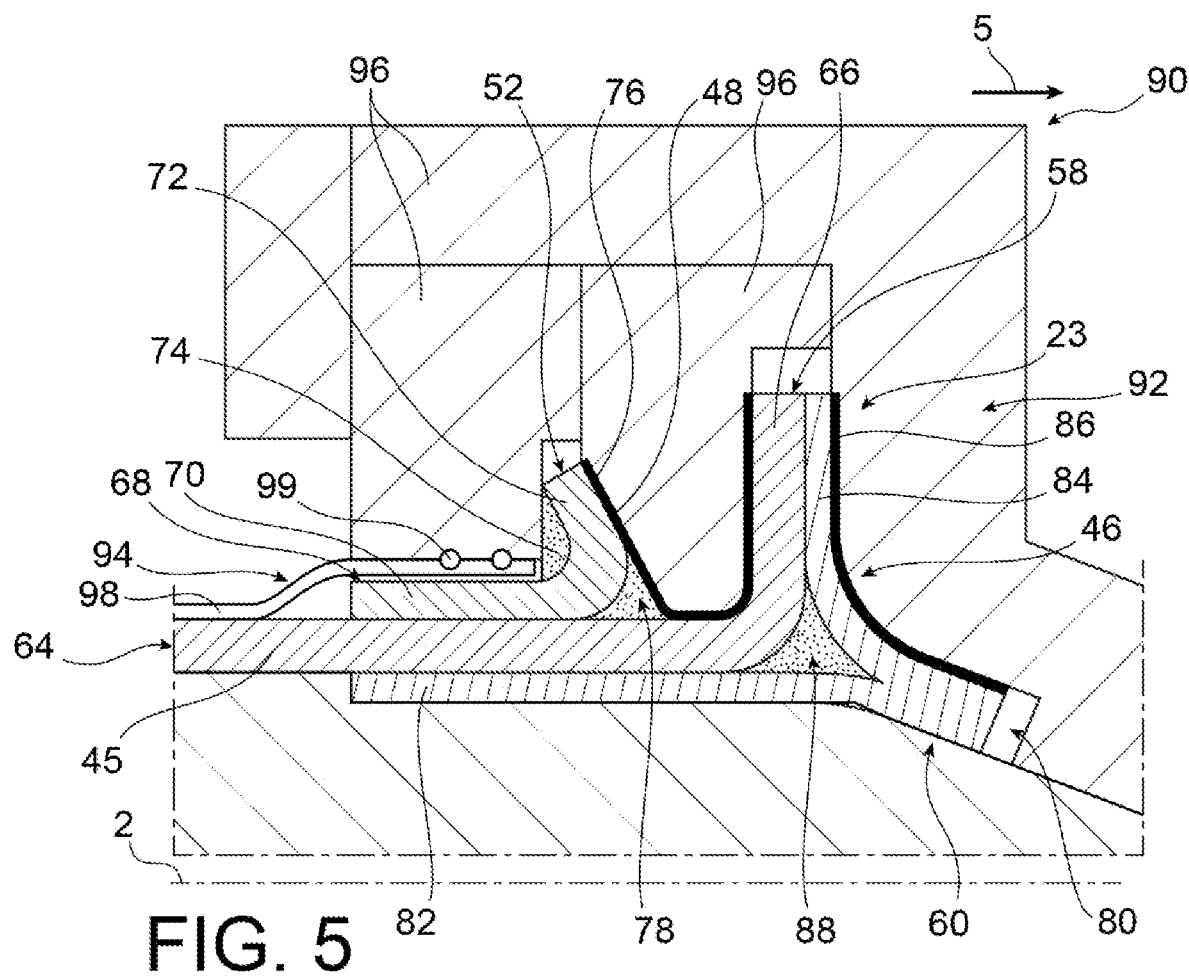
FIG. 5 shows a view similar to that in FIG. 4, during the steps of matrix injection and polymerisation.

With reference now to FIG. 5, a step of injecting resin by means of a hybrid tool is shown, this injection of resin being intended to impregnate the fibrous preforms 64, 68, 80 described with reference to FIG. 4, and to impregnate the fabrics forming the non-friction claddings 76, 86.

The hybrid tool 90 allows not only the co-injection of resin for impregnating all the elements 64, 68, 80, 76, 86, but also allows co-curing thereof leading to the polymerisation of the resin that impregnates them, as well as to the co-curing of the filling materials 74, 78, 88.

To do this, the hybrid tool 90 used is for example a combination between a rigid-mould resin transfer tool 92 (RTM type), and a flexible-injection tool 94.

More precisely, the rigid mould portions 96 are arranged on either side of the upstream and downstream groove walls 52, 58, as well as inside the groove 48. The rigid tool 92 is thus positioned to cooperate with the annular downstream connecting end of the exterior ferrule 23.

Moreover, the flexible injection tool 94 includes a flexible impermeable membrane 98, covering the external surface of the barrel 45 defined by the first preform 64, as far as extending over the external surface of the base 70 defined by the second preform 68. One or more gaskets 99 are interposed and compressed between the end of the membrane 98 resting on the base 70, and one of the rigid mould portions 96 of the RTM tool 92. The membrane 98 provides pressure on the piece to be consolidated during the injection of resin, either by effecting a vacuum in the impregnation chamber that it defines, or by means of a compaction chamber located on the opposite side of this membrane 98. By means of this hybrid tool 90, the resin is co-injected to impregnate, during one and the same phase, all the fibrous elements 64, 68, 80, 76, 86. The heating procured by this tool also allows co-curing of these elements, as well as the co-curing of the filling materials 74, 78, 88. The resin associated with all the elements 64, 68, 80, 76, 86, 74, 78, 88 can thus co-polymerise during one and the same heating phase. After this co-curing phase, the result is an "all composite" single piece, with all the consolidated/densified elements fixedly adhering to each other.

Numerous alternatives can be envisaged, in particular because of the optional character of numerous parts of the ferrule disclosed above, such as the non-friction claddings 76, 86, the gasket span 60, or the additional base 84 when such a gasket span is provided. Other alternatives also result from the fact that the curing is not necessarily implemented at the same time for all the elements of the ferrule, a phasing effectively being able to be used to implement successive curings, instead of a single co-curing such as the one described above.

Figure 6:
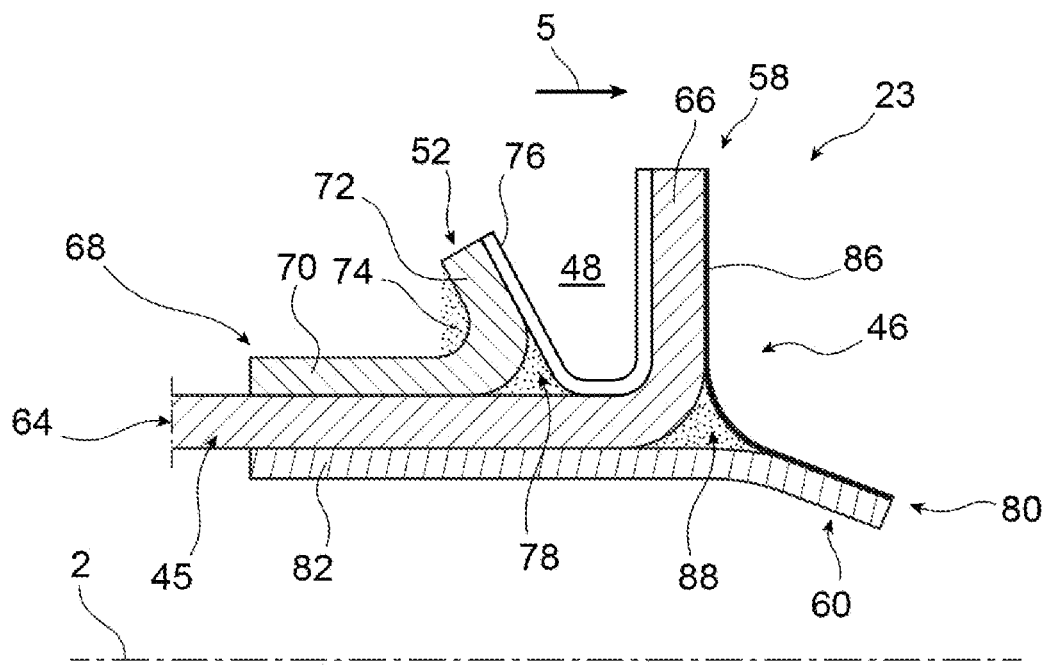
FIG. 6 is a view similar to that of FIG. 4, with the exterior ferrule in the form of another embodiment.

Thus another preferred embodiment is shown on FIG. 6, on which the third preform 80 includes only the base 82, and not the additional base. For this embodiment, the co-curing of the three preforms 64, 68, 80 still remains envisageable, but a subsequent curing of the third preform 80 could be implemented, after consolidation of the first and second preforms 64, 68.

Figure 7:
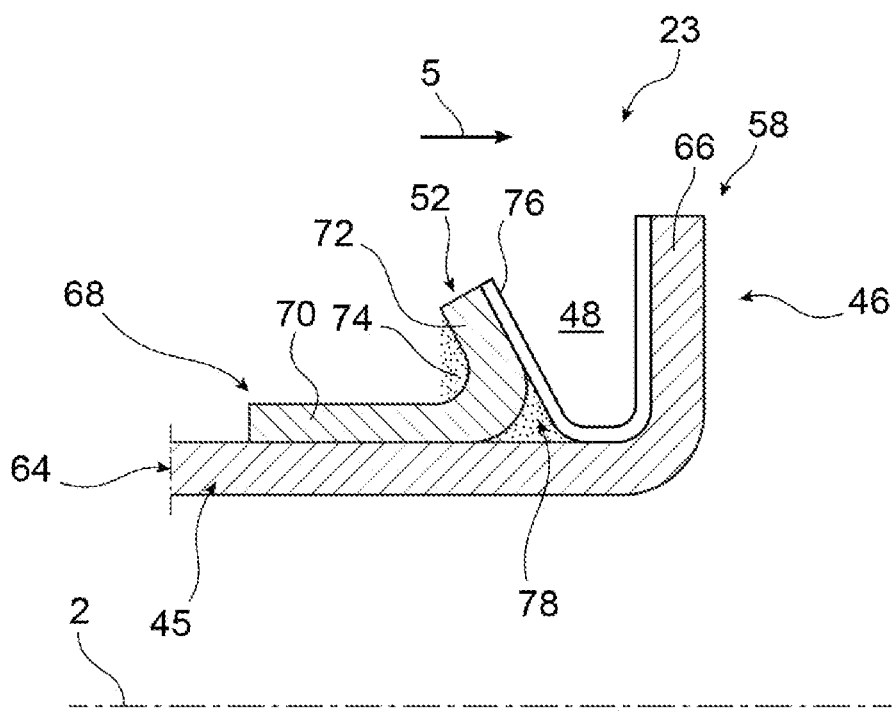
FIG. 7 is a view similar to that of FIG. 6, with the exterior ferrule in the form of another embodiment.

Yet another preferred embodiment is shown on FIG. 7, on which the third preform 80 is no longer provided, because of the non-necessity for the gasket span 60. For this embodiment, the co-curing of the two preforms 64, 68 still remains envisageable, but a subsequent curing of the second preform 68 could be implemented, after consolidation of the first preform 68, then serving as a support on which the second preform 68 would be consolidated/densified.

Of course, various modifications may be made by the person skilled in the art to the invention as described, by way of non-limiting examples only, the scope of which is defined by the appended claims.

What is claimed is:

1. Exterior ferrule of an intermediate casing for an aircraft turbine engine, the ferrule made from composite material comprising an annular connecting downstream end forming a peripheral groove radially open towards the outside, said groove being configured to receive a complementary connecting member provided on one or more nacelle cowls, and this groove being axially delimited by an upstream groove wall, as well as by a downstream groove wall,
wherein the ferrule is produced from:
a first fibrous preform obtained by three-dimensional weaving of threads and densified by a matrix, the first preform defining a barrel of the ferrule and a structural part of the downstream groove wall, projecting radially outwards with respect to the barrel; and
at least one second fibrous preform, each of the at least one second fibrous preforms being obtained by three-dimensional weaving of threads and densified by a matrix, the at least one second fibrous preform defining a base externally attached to the barrel defined by the first preform, as well as a structural part of the upstream groove wall, projecting radially outwards with respect to the barrel.

2. Ferrule according to claim 1, wherein, in the case that the at least one second fibrous preform is a single second fibrous preform, the single second fibrous preform has an annular or substantially annular shape centred on a longitudinal central axis of the ferrule, and wherein, in the other case that the at least one second fibrous preform is a group of second fibrous preforms, each of group of second fibrous preforms is in the form of an angular sector to form together an annular or substantially annular structure centred on the longitudinal central axis of the ferrule.

3. Ferrule according to claim 1, further comprising non-friction cladding covering the upstream and downstream groove walls, inside the groove, the non-friction cladding being a fabric or a foil.

4. Ferrule according to claim 1, further comprising at least one third fibrous preform, each of the at least one third fibrous preform being obtained by three-dimensional weaving of threads and densified by a matrix, the at least one third fibrous preform defining a base internally attached to the barrel defined by the first preform, as well as a structural gasket span projecting axially downstream beyond the downstream groove wall.

5. Ferrule according to claim 4, wherein the at least one third fibrous preform is loosened on weaving so as also to define an additional base externally attached to the downstream groove wall.

6. Aircraft turbine engine, comprising an exterior intermediate-casing ferrule according to claim 1.

7. Method for manufacturing an exterior ferrule of an intermediate casing for an aircraft turbine engine, the ferrule made from composite material comprising an annular connecting downstream end forming a peripheral groove radially open towards the outside, said groove configured to receive a complementary connecting member provided on one or more nacelle cowls, and this groove being axially delimited by an upstream groove wall, as well as by a downstream groove wall,
wherein the method includes the following steps:
producing a first fibrous preform by three-dimensional weaving of threads, the first preform being defining a barrel of the ferrule and a structural part of the downstream groove wall, projecting radially outwards with respect to the barrel;
producing at least one second fibrous preform, each of the at least one second fibrous preform being obtained by three-dimensional weaving of threads, the at least one second fibrous preform defining a base as well as a structural part of the upstream groove wall, projecting radially outwards with respect to the barrel;
injecting and polymerising a matrix for densifying the first fibrous preform; and
injecting and polymerising a matrix for densifying the at least one second fibrous preform, so that the base is fixedly and externally attached to the barrel of the ferrule.

8. Method according to claim 7, wherein the injection of a matrix for densifying the first preform takes place at the same time as the injection of a matrix for densifying the at least one second fibrous preform, by matrix co-injection in a flexible-injection tool, in a rigid-mould matrix transfer tool, or in a hybrid flexible-injection and rigid-mould matrix transfer tool.

9. Method according to claim 7, wherein first of all the injection and polymerisation of a matrix for densifying the first preform is proceeded with, in a rigid-mould matrix transfer tool, then next, during a subsequent curing step, the injection and polymerisation of a matrix for densifying the at least one second fibrous preform is proceeded with, in a rigid-mould matrix transfer tool.

10. Method according to claim 7, further comprising the production of a non-friction cladding covering the upstream and downstream groove walls, inside the groove, the non-friction cladding being produced by co-curing during the curing of the first preform and of the second fibrous preform, or bonded to the upstream and downstream groove walls after said curing.

11. Method according to claim 7, further comprising:
the production of a third fibrous preform or a group of third fibrous preforms, each third preform being obtained by three-dimensional weaving of threads, the third preform or the group of third preforms define a base as well as a structural gasket span projecting axially downstream beyond the downstream groove wall; and
injection and polymerisation of a matrix for densifying the third preform or of the group a third preforms, so that the base is fixedly and internally attached to the barrel of the ferrule.

* * * * *